(12) United States Patent
Landi et al.

(10) Patent No.: US 7,163,654 B2
(45) Date of Patent: Jan. 16, 2007

(54) RECHARGEABLE COMPOSITE PLY APPLICATOR

(75) Inventors: Dennis J. Landi, Broomall, PA (US); Terrance Gondek, Harleysville, PA (US); Philip Persaud, Boothwyn, PA (US)

(73) Assignee: The Boeing Company, Chicago, IL (US)

( * ) Notice: Subject to any disclaimer, the term of this patent is extended or adjusted under 35 U.S.C. 154(b) by 33 days.

(21) Appl. No.: 11/186,582

(22) Filed: Jul. 21, 2005

(65) Prior Publication Data

US 2005/0252902 A1 Nov. 17, 2005

Related U.S. Application Data

(62) Division of application No. 10/272,085, filed on Oct. 16, 2002, now Pat. No. 7,021,358.

(51) Int. Cl.
*B32B 37/00* (2006.01)

(52) U.S. Cl. .......................................... 264/320; 156/71

(58) Field of Classification Search .................. 156/71, 156/228, 574, 579, 580, 583.1, 583.3, 196, 156/209, 219; 219/245; 100/315, 326; 264/319, 264/320
See application file for complete search history.

(56) References Cited

U.S. PATENT DOCUMENTS

| 2,609,316 | A |   | 9/1952  | Fichtner |
|-----------|---|---|---------|----------|
| 2,814,710 | A |   | 11/1957 | Schuetze |
| 4,238,665 | A | * | 12/1980 | Tremarco .................... 219/238 |
| 4,699,686 | A |   | 10/1987 | Franke |
| 4,829,157 | A |   | 5/1989  | Loyd |
| 5,039,371 | A | * | 8/1991  | Cremens et al. ............ 156/382 |
| 5,475,199 | A |   | 12/1995 | Buchanan |
| 5,944,943 | A |   | 8/1999  | Kwok et al. |
| 6,140,610 | A |   | 10/2000 | Siragusa |
| 6,172,335 | B1 |  | 1/2001  | Goodrich |

* cited by examiner

*Primary Examiner*—James Sells
(74) *Attorney, Agent, or Firm*—Ostrager Chong Flaherty & Broitman P.C.

(57) ABSTRACT

An apparatus for the application of aerospace composite laminates 10 is provided, including a non-contaminating outer layer 24 and an insulated base 12. The present invention further includes a constant temperature heating element 22 positioned between the non-contaminating outer layer 24 and the insulated base 12. A battery pack 32 is positioned within the insulated base 12 to power the constant temperature heating element 22. The present invention can further include an ergonomic element 34 mounted to the insulated base 12 to facilitate handling of the apparatus 10 for the application of aerospace composite laminates.

4 Claims, 1 Drawing Sheet

RECHARGEABLE COMPOSITE PLY APPLICATOR

CROSS-REFERENCE TO RELATED APPLICATIONS

This is a division of U.S. patent application Ser. No. 10/272,085 filed on Oct. 16, 2002 now U.S. Pat. No. 7,021,358.

TECHNICAL FIELD

The present invention relates generally to an apparatus and method for the application of laminate plies utilized in lay-ups of aerospace composite laminates and more specifically to an apparatus and method for the application of laminate plies utilized in lay-ups of aerospace composite laminates with simple cordless operation.

BACKGROUND OF THE INVENTION

Aerospace laminates are widely used throughout the aerospace industry. They provide high strength and low weight structures that are responsible for increased efficiency, reduced costs, improved performance, and broadened applications within the aerospace field. Although aerospace laminates are widely utilized and are credited with a wide variety of benefits and savings when applied to aerospace structures, they often present undesirable characteristics when implemented by modern practices.

As a result of the fiber weave and resin content of preimpregnated composite material, it can be extremely difficult and time consuming to lay-up a composite part with any degree of contour or complex shape. The composite mechanic currently uses a portable hot air gun in one hand to gently warm the composite material. In the mechanics other hand, a non-contaminating glove or sweep is utilized to stretch and conform the composite material into the required shape of the part being laid up. Although this method can be successful in the reduction of wrinkles and uneven application of fiber weave, it presents several problematic issues to the process of composite lay-up.

One known issues stems from the wide range of heat variations arising from the use of the portable heat gun. It is known that this wide range of heat variation can be detrimental to the resin flow characteristics of the composite material. In addition to the undesirable effect on resin flow characteristics, the described methodology additionally can result in premature advancement of the resin system, causing voids in the completed laminate.

The heat-gun approach to composite lay-up can also result in undesirable characteristics stemming from the mechanic implementing the process. The present system presents undesirable ergonomic challenges to the operator by requiring coordination of the motion of both of the operators hands during the process for what can be extended lengths of time. The mechanic must often be properly seated to minimize the effects of this ergonomic challenge. Even with the optimum placement and seating of the mechanic it is known that bridging of the material can occur with resultant voids in the cured part. This is clearly undesirable. Additionally, the mechanic is often required to bend over the tool repeatedly using two hands to perform the operations. This can lead to mechanic fatigue and resultant errors in application.

It would therefore be highly desirable to have apparatus for the application of laminate plies utilized in lay-ups of aerospace composite laminates that provided improved application, reduced flow time, and a reduction in material bridging. It would further be highly desirable to develop an apparatus for the application of laminate plies utilized in lay-ups of aerospace composite laminates that improved mechanic ergonomic operation, reduced mechanic fatigue, and improved mechanic reliability.

SUMMARY OF THE INVENTION

It is therefore an object to the present invention to provide an apparatus for the application of aerospace composite laminates with improved performance. It is further object to the present invention to provide an apparatus for the application of aerospace composite laminates with improved operator ergonomics and reduced operator fatigue.

In accordance with the objects of the present invention an apparatus for the application of aerospace composite laminates is provided. The apparatus for the application of aerospace composite laminates includes a non-contaminating outer layer and an insulated base. The present invention further includes a constant temperature heating element positioned between the non-contaminating outer layer and the insulated base. A battery pack is positioned within the insulated base to power the constant temperature heating element. The present invention can further include an ergonomic element mounted to the insulated base to facilitate handling of the apparatus for the application of aerospace composite laminates.

Other objects and features of the present invention will become apparent when viewed in light of the detailed description and preferred embodiment when taken in conjunction with the attached drawings and claims.

DESCRIPTION OF PREFERRED EMBODIMENTS

Figure 1:
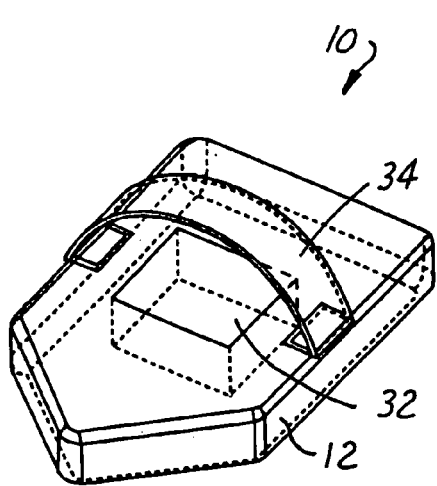
FIG. 1 is an illustration of an apparatus for the application of aerospace composite laminates in accordance with the present invention.
Figure 2:
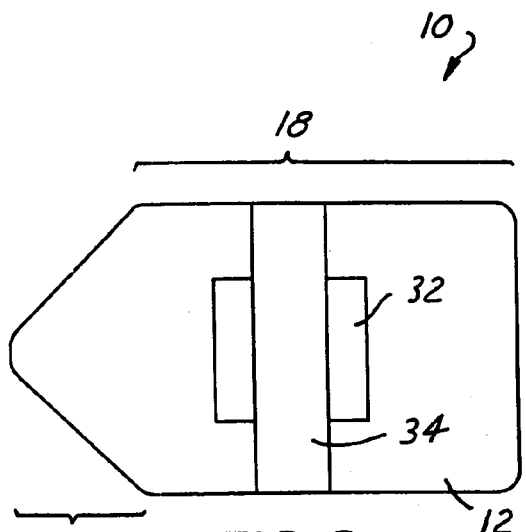
FIG. 2 is a top-view illustration of the apparatus for the application of aerospace composite laminates illustrated in FIG. 1.
Figure 3:
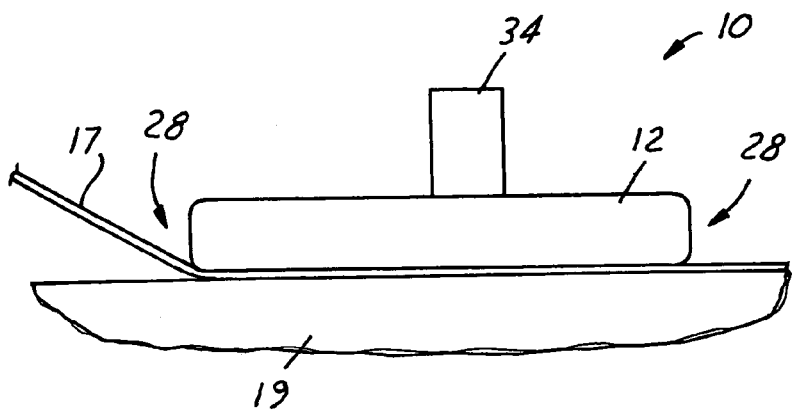
FIG. 3 is a side view illustration of the apparatus for the application of aerospace composite laminates illustrated in FIG. 1.
Figure 4:
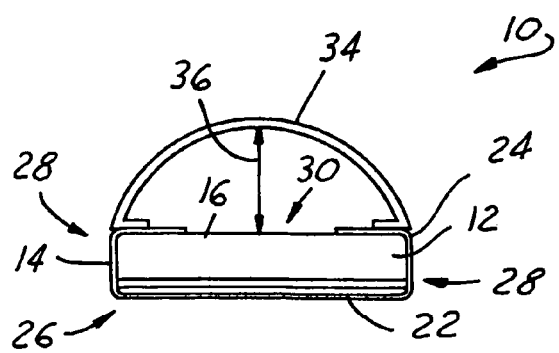
FIG. 4 is a cross-sectional illustration of the apparatus for the application of aerospace composite laminates illustrated in FIG. 3, the cross-section taken along the line 4—4 in the direction of the arrows.

Referring now to FIG. 1 which is an illustration of an apparatus for the application of aerospace composite laminates 10 in accordance with the present invention. The apparatus 10 includes an insulated base 12. Although it is contemplated that the insulated base 12 may be comprised of a variety of materials with a variety of characteristics, in one embodiment (see FIG. 4) the insulated base is contemplated to comprise an insulation barrier layer 14 mounted to an insulation padding layer 16. Additionally, although it is contemplated that the insulated base 12 may encapsulate a variety of characteristics, in one embodiment it is contemplated that the insulated base 12 is flexible such that it can easily conform to a wide variety of contours such that laminate plies 17 (prepreg/composite material) may be applied to tools 19 with complex shapes. Although the insulated base 12 may be formed in a variety of shapes, it is contemplated that it can include a rectangular body section 18 for application to larger areas and a triangular nose section 20 (see FIG. 2) for application into tightly contoured areas. The insulated base 12 is contemplated to be sized for one handed operation and therefore is preferably sized to be slightly larger than a human hand.

The present invention further includes a constant temperature heating element 22. The constant temperature heating element 22 allows the apparatus 10 to be directly and continuously applied to preimpregnated composite material 17 (commonly fiber material and resin system) with no detrimental effects on the resin flow characteristics or premature advancement of the resin system. The constant temperature heating element 22 is intended to provide a uniform temperature from the apparatus 10. It should be understood that the term "constant temperature" is intended to refer to the uniformity of temperature emanating from the heating element 22 and not the inability to adjust the operating temperature of the apparatus 10. In at least one embodiment it is contemplated that the operating temperature can be adjusted to a variety of specific temperatures to coincide with specific applications or materials. The constant temperature heating element 22 improves upon prior designs by enhancing the drapeability of the prepreg material 17 without advancing the resin system. Although a variety of constant temperature heating elements 22 are contemplated, one embodiment contemplates the use of a flexible constant temperature heating element 22. The use of the flexible constant temperature heating element 22 in combination with the flexible insulated base 12 allows the apparatus 10 to evenly apply temperature and smoothing force to the prepreg 17 especially when the apparatus is applied to complex shaped, contoured tool 19.

The present invention further includes a non-contaminating outer layer 24. The non-contaminating outer layer 24 is preferably a non-stick layer 24 which will easily glide over the prepreg material 17. The non-contaminating outer layer 24 will preferably prevent resin from the prepreg material 17 from adhering to the apparatus 10 or for contaminants to be transferred to the preimpregnated composite material preimpregnated composite material. Although a variety of non-contaminating outer layers 24 are contemplated, one embodiment contemplates the use of a release film. Although the non-contaminating outer layer 24 may only be applied to the bottom surface 26 of the apparatus 10, it is contemplated that it may be use to wrap around the side surfaces 28 and onto the upper surface 30 of the apparatus 10 as well. This complete coverage assists the apparatus in resisting resin build up and contamination. Again, although a variety of non-contaminating outer layers 24 are contemplated, a flexible non-contaminating outer layer 24 is preferably such that the apparatus 10 as a whole can easily conform to the complex surfaces of the prepreg material 17 and tool 19 layout.

The constant temperature heating element 22 is preferably powered by a power unit 32. Although a variety of power units 32 are contemplated, in one preferred embodiment the power unit 32 comprises a battery pack 32. A variety of batter packs 32 are contemplated although a long-life rechargeable battery pack 32 is preferable. In one embodiment it is contemplated that the batter pack 32 is removable from the insulated base 12 such that it can be easily placed in a remote re-charger (not shown) or quickly swapped with a fully charged batter pack 32. In other embodiments, however, the battery pack 32 may remain within the apparatus 10 and the entire apparatus 10 may be attached to a charging unit for re-charging.

Finally, it is contemplated that the apparatus 10 may further include an ergonomic element 34 positioned on the upper surface 30 of the insulated base 12. The ergonomic element 34 is preferably designed to allow one handed operation of the apparatus such that operator fatigue is reduced and the second hand of the operator may be utilized for balance. Although a variety of ergonomic elements 34 would become apparent to one skilled in the art as a result of this disclosure, one embodiment contemplates the use of a strap element 34 with a strap height 36 sufficient to accommodate a human hand, preferably gloved for safety. The strap element 34 may be fixed with a universal strap height 36 or it may be adjustable such that the strap height 36 can be modified in accordance to the dimensions of each operator. Although a strap element 34 has been described, it should be understood that a variety of ergonomic elements 34 are contemplated by the present invention that may include, but are not limited to, handles, grips, indentations, or contours that allow an operator to conveniently grip and operate the apparatus 10 utilizing only a single hand.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A method of smoothing out wrinkles in pre-impregnated material applied during the construction of composite laminates comprising:

laying up a layer of pre-impregnated material onto a tool;

smoothing out wrinkles in the pre-impregnated material using a one-handed apparatus comprising, a top surface, a bottom surface and a plurality of side surfaces;

an insulated base;

a flexible non-contaminating non-stick outer layer;

a flexible heating element positioned between said insulated base and said flexible non-contaminating non-stick outer layer, said flexible heating element transmitting heat through said flexible non-contaminating non-stick outer layer to the pre-impregnated material;

a power unit positioned within said insulated base, said power unit supplying energy to said flexible heating element; and an ergonomic element positioned on said top surface wherein the apparatus can be moved across the pre-impregnated material using single-handed operation.

2. A method as described in claim 1 wherein said one-handed apparatus comprises a flexible apparatus capable of conforming to the contours of said tool.

3. A method of smoothing out wrinkles in pre-impregnated material applied during the construction of composite laminates comprising;

laying up a layer of pie-impregnated material onto a tool;

smoothing out wrinkles in the pie-impregnated material using a one-handed apparatus comprising, a top surface, a bottom surface and a plurality of side surfaces;

an insulated base;

a non-contaminating outer layer;

a constant-temperature heating element positioned between said insulated base and said non-contaminating outer layer, said constant-temperature heating element transmitting heat through said non-contaminating outer layer to the pre-impregnated material, said constant temperature heating element comprising a flexible heating element; and an ergonomic element positioned on said top surface wherein the apparatus can be moved across the pre-impregnated material using single-handed operation.

4. A method as described in claim 3 wherein said one-handed apparatus comprises a flexible apparatus capable of conforming to the contours of said tool.

* * * * *